(12) United States Patent
Dai et al.

(10) Patent No.: US 9,498,809 B2
(45) Date of Patent: Nov. 22, 2016

(54) SHAPING METHOD FOR METALLIC MATRIX

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Wei-Zhong Dai, Jiashan (CN); Jie Ni, Jiashan (CN); Hu Wu, Jiashan (CN)

(73) Assignees: FU DING ELECTRICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 14/523,196

(22) Filed: Oct. 24, 2014

(65) Prior Publication Data

US 2015/0121980 A1    May 7, 2015

(30) Foreign Application Priority Data

Nov. 6, 2013   (CN) .......................... 2013 1 0542706

(51) Int. Cl.
| | |
|---|---|
| B21D 1/06 | (2006.01) |
| B21D 1/00 | (2006.01) |
| B21C 51/00 | (2006.01) |
| B21D 3/02 | (2006.01) |
| G01B 21/30 | (2006.01) |

(52) U.S. Cl.
CPC ................. *B21D 1/00* (2013.01); *B21C 51/00* (2013.01); *B21D 1/06* (2013.01); *B21D 3/02* (2013.01); *G01B 21/30* (2013.01)

(58) Field of Classification Search
CPC .......... B21C 51/00; B21D 3/02; B21D 1/06; B21D 1/00; G01B 21/30
USPC ......................................................... 72/19.7
See application file for complete search history.

(56) References Cited

U.S. PATENT DOCUMENTS

| | | | | |
|---|---|---|---|---|
| 6,029,485 | A | * | 2/2000 | Bohmer .................... B21D 3/05 72/11.1 |
| 6,035,259 | A | * | 3/2000 | Graff .................. B65H 23/0204 702/33 |
| 6,769,279 | B1 | * | 8/2004 | Bergman ................. B21D 1/02 72/11.4 |
| 7,185,519 | B2 | * | 3/2007 | Clark ...................... B21B 37/28 72/11.7 |

\* cited by examiner

*Primary Examiner* — David B Jones
(74) *Attorney, Agent, or Firm* — Zhigang Ma

(57) ABSTRACT

A metallic matrix shaping method is provided. A flatness of a plurality of points of the metallic matrix is measured by a shape test device, and a flatness margin of error H between a reference level and the flatness of the metallic matrix is calibrated using the least square method. A controller determines whether the points of the metallic matrix need to be shaped by comparing the flatness margin of error H and a permissive error range K. The controller calibrates a descending distance P by a mathematical formula of $P=M+[(H-K)/D]/N+L$. A shaping device shapes the metallic matrix according to the descending distance P and a shaping time. The above steps are repeated until the flatness of the metal is within the permissive error range K.

10 Claims, 2 Drawing Sheets

| 101 |
|---|
| Measuring a flatness of a plurality of points of a metallic matrix by a shape test device, and calibrating a flatness margin of error H between a reference level and the flatness of the metallic matrix using the least square method |

↓

| 102 |
|---|
| Providing a controller electrically connected to the shape test device, and a permissive error range K and a maximal error being preset therein, the controller determining whether the metallic matrix needs to be shaped by comparing the flatness margin of error H with the permissive error range K and the maximal error |

↓

| 103 |
|---|
| Presetting a shaping base level in the controller, the controller determining a first position and a second position by comparing the shaping base level with the reference level, the first position being coplanar with the shaping base level and the reference level, the second position being non-coplanar with the shaping base level and the reference level |

↓

| 104 |
|---|
| Presetting a plurality of predetermined shaping times relative to the flatness margin of error H in the controller, the controller calibrating a shaping time N of the second position by the flatness margin of error H and the predetermined shaping times |

↓

| 105 |
|---|
| The controller calibrating a descending distance P by a mathematical formula of P=M+ [(H−K)/D] /N+L |

↓

| 106 |
|---|
| Providing a shaping device electrically connected to the controller, the shaping device shaping the metal member according to the descending distance P and the shaping time N |

↓

| 107 |
|---|
| Repeating the above steps until the flatness margin of error H of the metallic matrix is within the permissive error range K |

FIG. 1

SHAPING METHOD FOR METALLIC MATRIX

FIELD

The subject matter herein generally relates to a shaping method for a metallic matrix.

BACKGROUND

After being processed, a work-piece needs to be flat within a predetermined range. The flatness of the work-piece is measured with a micrometer, and is determined to qualify or not by the measurements. The unqualified work-piece is reshaped to match qualifications manually with a shaping tool.

BRIEF DESCRIPTION OF THE FIGURE

Implementations of the present technology will now be described, by way of example only, with reference to the attached figure.

FIG. 1 illustrates a flow chart of a process for a shaping method for a metallic matrix.

DETAILED DESCRIPTION

Figure 2:
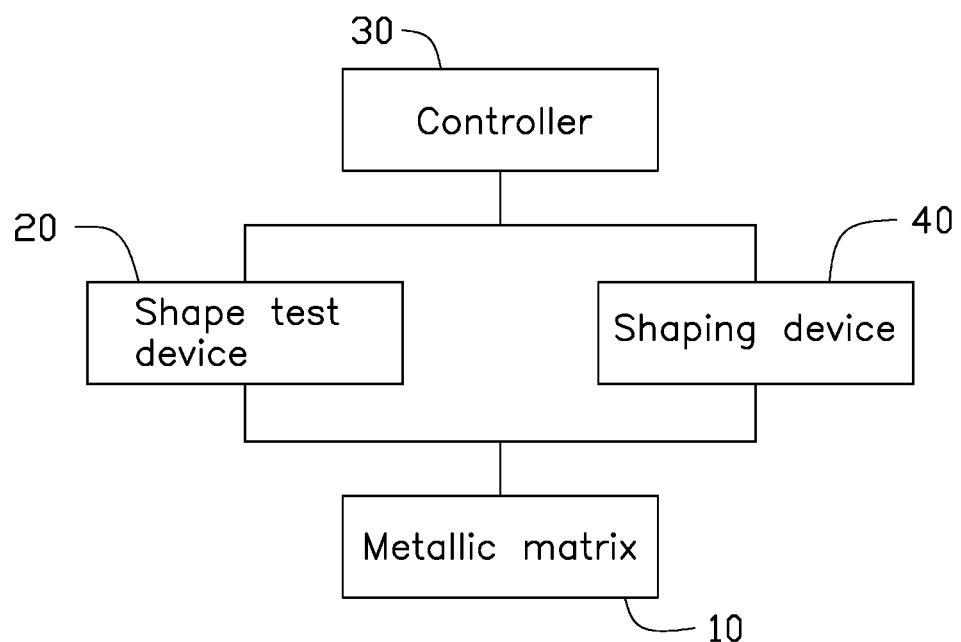
FIG. 2 illustrates a schematic diagram for shaping the metallic matrix.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a flowchart in accordance with an example embodiment. FIG. 2 illustrates a schematic diagram for shaping the metallic matrix. The example method is provided by way of example, as there are a variety of ways to carry out the method. Each block shown in the FIG. 1 represents one or more processes, methods or subroutines, carried out in the example method. Additionally, the illustrated order of blocks is by example only and can change according to the present disclosure. The example method can begin at block 101.

In block 101, a flatness of a plurality of points of a metallic matrix 10 can be measured by a shape test device 20, and a flatness margin of error H between a reference level and the flatness of the metallic matrix 10 can be calibrated using a least square method.

A least square level can be defined as a level that allows a sum of squared distances between the plurality of points of the metallic matrix 10 and the least square level to be minimal. The reference level can be defined as the least square level of the measured metallic matrix 10. The flatness margin of error H can be a distance between two levels parallel with the least square level.

The plurality of points of the metallic matrix 10 can be measured by the shape test device 20. The flatness can be calibrated by Visual Basic (VB). In the illustrated embodiment, the metallic matrix 10 can be an aluminum substrate, and the flatness margin of error H can be 0.7 mm.

In block 102, a controller 30 electrically connected to the shape test device 20 can be provided, and a permissive error range K and a maximal error can be preset in the controller 30. The controller 30 can determine whether the metallic matrix 10 needs to be shaped by comparing the flatness margin of error H with the permissive error range K and the maximal error.

If the flatness margin of error H is within the permissive error range K, the controller 30 determines that the metallic matrix 10 does not need to be shaped. If the flatness margin of error H is out of the permissive error range K and is smaller than the maximal error, the controller 30 determines that the metallic matrix 10 needs to be shaped. If the flatness margin of error H is greater than the maximal error, the controller 30 can determine that the metallic matrix 10 needs to be reshaped.

In the illustrated embodiment, the permissive error range K can be less than or equal to 0.4 mm, and the maximal error can be 1 mm. The flatness margin of error H of the aluminum substrate can be 0.7 mm, therefore the aluminum substrate needs to be shaped and can go to block 103.

In block 103, a shaping base level can be preset in the controller 30. The shaping base level can be a level of the qualified metallic matrix 10. The controller 30 can determine a first position and a second position by comparing the shaping base level with the reference level. The first position can be coplanar with the shaping base level and the reference level. The second position can be non-coplanar with the shaping base level and the reference level.

In the illustrated embodiment, the aluminum substrate can be a substantially rectangular plate, and can include four corners. When one of the four corners is uneven, the shaping position can be positioned at the uneven corner, and the pivot can be positioned at the other corners. In another embodiment, when two of the four corners are uneven, the second position can be positioned at the two uneven corners, and the first position can be positioned at the other corners.

In block 104, a plurality of predetermined shaping times relative to the flatness margin of error H can be preset in the controller 30, and the controller 30 can calibrate a shaping time N of the second position by the flatness margin of error H and the predetermined shaping times.

In the illustrated embodiment, when the flatness margin of error H is greater than 0.4 mm and is less than or equal to 0.6 mm, the predetermined shaping time can be 1. When the flatness margin of error H is greater than 0.6 mm and is less than or equal to 0.8 mm, the predetermined shaping time can be 2. When the flatness margin of error H is greater than 0.8 mm and is less than or equal to 1.0 mm, the predetermined shaping time can be 3. When the flatness margin of error H is greater than 1.0 mm, the metallic matrix 10 needs to be reshaped. The flatness margin of error H of the aluminum substrate can be 0.7 mm, therefore the shaping time N of the aluminum substrate can be 2.

In block 105, the controller 30 can calibrate a descending distance P by a mathematical formula of $P=M+[(H-T)/D]/N+L$.

M can be a deformation threshold of the metallic matrix 10. T can be a maximum of the permissive error range K. D can be each distance increase in an adjusted shaping value for every 1 mm increase in the descending distance P. L can be a compensation of the descending distance P.

The deformation threshold M, the compensation L, and the adjusted shaping value D can be preset in the controller 30 according to material characteristics of the metallic matrix 10. A maximum of the descending distance P can be preset in the controller 30, and the descending distance P can be not greater than the maximum. If the descending distance P is greater than the maximum, the shaping position can be lowered. In the illustrated embodiment, the deformation threshold M can be 12 mm, the maximum T of the permissive error range K can be 0.4 mm, the adjusted shaping value D can be 0.05 mm, the flatness margin of error H can be 0.7 mm, the compensation L can be 5 mm, and the shaping time N can be two. The descending distance P can be 20 mm by the mathematical formula of $P=12+[(0.7-0.4)/0.05]/2+5$ mm. The maximum of the descending distance P can be 21 mm.

In block 106, a shaping device 40 electrically connected to the controller 30 is provided, the shaping device 40 can shape the metallic matrix 10 according to the descending distance P and the shaping time N.

The shaping device 40 can include a pivot shaft and a descending shaft. The pivot shaft can be abutted the first position, and the descending shaft can be abutted the second position. In the illustrated embodiment, the descending shaft of the shaping device 40 can press the second position of the aluminum substrate in 20 mm, and the descending shaft can return to a proper position, and does not touch the aluminum substrate. The shaping time N can be two, therefore the descending shaft can repeat the above step once more.

In block 107, the above blocks can be repeated until the flatness margin of error H of the metallic matrix 10 is within the permissive error range K.

In at least one embodiment, the maximal error can be omitted, and the second position of the metallic matrix 10 can be shaped to allow the metallic matrix 10 to be qualified. In at least one embodiment, the block 104 can be omitted.

The embodiments shown and described above are only examples. Many details are often found in the art such as the other features of a shaping method for the metallic matrix. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A shaping method for a metallic matrix comprising:
  measuring a flatness of a plurality of points of the metallic matrix by a shape test device, and calibrating a flatness margin of error H between a reference level and the flatness of the metallic matrix using a least square method;
  providing a controller electrically connected to the shape test device, and presetting a permissive error range K in the controller, the controller comparing the flatness margin of error H with the permissive error range K, if the flatness margin of error H being within the permissive error range K, the metallic matrix does not need to be shaped, if the flatness margin of error H is out of the permissive error range K, the metallic matrix needs to be shaped;
  presetting a shaping base level in the controller, the controller determining a first position and a second position by comparing the shaping base level with the reference level, and the first position being coplanar with the shaping base level and the reference level, the second position being non-coplanar with the shaping base level and the reference level;
  the controller calibrating a descending distance P by a mathematical formula of $P=M+[(H-T)/D]/N+L$ according to material characteristics of the metallic matrix, with P being a descending distance, H being a flatness error, T being a maximum of the permissive error range K, N being a shaping time, L being a compensation of the descending distance P, M being a deformation threshold of the metallic matrix, and D being an each distance increase in an adjusted shaping value for every 1 mm increase in the descending distance P;
  providing a shaping device electrically connected to the controller, the shaping device having a pivot shaft and a descending shaft, the pivot shaft abutting the first position, and the descending shaft abutting the second position, the descending shaft pressing the second position according to the descending distance P to realize the shaping; and
  repeating until the flatness margin of error H of the metallic matrix is within the permissive error range K.

2. The shaping method for the metallic matrix as claimed in claim 1, wherein a plurality of predetermined shaping times relative to the flatness margin of error H are preset in the controller, and the controller calibrates the shaping time N of the second position by the flatness margin of error H and the predetermined shaping times.

3. The shaping method for the metallic matrix as claimed in claim 2, wherein
  when the flatness margin of error H is greater than 0.4 mm and is less than or equal to 0.6 mm, the predetermined shaping time is one;
  when the flatness margin of error H is greater than 0.6 mm and is less than or equal to 0.8 mm, the predetermined shaping time is two; and
  when the flatness margin of error H is greater than 0.8 mm and is less than or equal to 1.0 mm, the predetermined shaping time is three.

4. The shaping method for the metallic matrix as claimed in claim 1, wherein
  a maximal error is preset in the controller, the controller determines whether the metallic matrix needs to be shaped by comparing the flatness margin of error H with the permissive error range K and the maximal error; and
  if the flatness margin of error H is out of the permissive error range K and is smaller than the maximal error, the controller determines the metallic matrix needs to be shaped, and if the flatness margin of error H is greater than the maximal error, the controller determines the metallic matrix needs to be reshaped.

5. The shaping method for the metallic matrix as claimed in claim 1, wherein the plurality of points of the metallic matrix is measured by the shape test device, a least square level of the measured metallic matrix is the reference level;

the least square level is a level that allows a sum of squared distances between the plurality of points of the metallic matrix and the least square level to be minimal; and a distance between two levels parallel with the least square level is a flatness margin of error H.

6. The shaping method for the metallic matrix as claimed in claim 1, wherein the deformation threshold M, the compensation L, and the adjusted shaping value D are preset in the controller according to material characteristics of the metallic matrix.

7. The shaping method for the metallic matrix as claimed in claim 1, wherein the metallic matrix is an aluminum substrate.

8. The shaping method for the metallic matrix as claimed in claim 7, wherein each 0.05 mm increases in the adjusted shaping value D for every 1 mm increasing in the descending distance P.

9. The shaping method for the metallic matrix as claimed in claim 7, wherein the permissive error range K is less than or equal to 0.4 mm.

10. The shaping method for the metallic matrix as claimed in claim 1, wherein a maximum of the descending distance P is preset in the controller, and the descending distance P is smaller than the maximum.

\* \* \* \* \*